United States Patent
Brunet et al.

(10) Patent No.: US 6,934,907 B2
(45) Date of Patent: Aug. 23, 2005

(54) METHOD FOR PROVIDING A DESCRIPTION OF A USER'S CURRENT POSITION IN A WEB PAGE

(75) Inventors: Thomas Andrew Brunet, Round Rock, TX (US); Elliott Woodard Harris, Austin, TX (US); Lawrence Frank Weiss, Round Rock, TX (US); Guido Dante Corona, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 09/815,546

(22) Filed: Mar. 22, 2001

(65) Prior Publication Data

US 2002/0138515 A1 Sep. 26, 2002

(51) Int. Cl.$^7$ .............................................. G06F 15/00
(52) U.S. Cl. ................................... 715/501.1; 715/728
(58) Field of Search .............................. 715/501.1, 513, 715/727, 728, 729; 345/727, 728, 729

(56) References Cited

U.S. PATENT DOCUMENTS

| | | | | | |
|---|---|---|---|---|---|
| 5,412,189 | A | * | 5/1995 | Cragun | 235/379 |
| 5,461,399 | A | * | 10/1995 | Cragun | 715/729 |
| 5,557,722 | A | * | 9/1996 | DeRose et al. | 715/513 |
| 5,583,478 | A | * | 12/1996 | Renzi | 340/407.1 |
| 5,644,776 | A | * | 7/1997 | DeRose et al. | 715/500 |
| 6,073,144 | A | * | 6/2000 | van Hoff | 715/513 |
| 6,085,161 | A | * | 7/2000 | MacKenty et al. | 704/270 |
| 6,088,675 | A | * | 7/2000 | MacKenty et al. | 704/270 |
| 6,108,629 | A | * | 8/2000 | Kasday | 704/258 |
| 6,115,686 | A | * | 9/2000 | Chung et al. | 704/260 |
| 6,230,212 | B1 | * | 5/2001 | Morel et al. | 719/316 |
| 6,300,957 | B1 | * | 10/2001 | Rao et al. | 345/441 |
| 6,349,132 | B1 | * | 2/2002 | Wesemann et al. | 379/88.17 |
| 6,493,717 | B1 | * | 12/2002 | Junkin | 707/102 |
| 6,538,673 | B1 | * | 3/2003 | Maslov | 345/853 |
| 6,556,973 | B1 | * | 4/2003 | Lewin | 704/277 |
| 6,594,348 | B1 | * | 7/2003 | Bjurstrom et al. | 379/88.13 |
| 6,636,831 | B1 | * | 10/2003 | Profit et al. | 704/275 |
| 6,718,516 | B1 | * | 4/2004 | Claussen et al. | 715/513 |
| 6,812,941 | B1 | * | 11/2004 | Brown et al. | 715/854 |
| 2001/0032234 | A1 | * | 10/2001 | Summers et al. | 709/201 |
| 2002/0052747 | A1 | * | 5/2002 | Sarukkai | 704/270 |
| 2002/0057269 | A1 | * | 5/2002 | Barber et al. | 345/418 |
| 2002/0080927 | A1 | * | 6/2002 | Uppaluru | 379/88.01 |
| 2002/0095422 | A1 | * | 7/2002 | Burrows et al. | 707/100 |
| 2002/0111974 | A1 | * | 8/2002 | Dutta et al. | 707/526 |
| 2002/0161579 | A1 | * | 10/2002 | Saindon et al. | 704/235 |
| 2003/0098803 | A1 | * | 5/2003 | Gourgey et al. | 341/21 |
| 2003/0164848 | A1 | * | 9/2003 | Dutta et al. | 345/729 |
| 2003/0212759 | A1 | * | 11/2003 | Wu | 709/218 |

OTHER PUBLICATIONS

Rai, The Web Finds Its Voice, Google Jun. 2000, pp. 1–4.*
Pash, Designing for Access to the Web for Blind and Visually Impaired Users, Google Feb. 25, 1998, pp. 1–7.*
Goose et al., A 3D Audio only Interactive Web Browser: Using Spatialization to Convey Hypermedia Document Structure, ACM 1999, pp. 363–371.*
Raman et al., Interactive Audio Documents, ACM 1994, pp. 62–68.*
Grigonis et al., Toward TML, Computer Telephony, Aug. 1999, vol. 7, Iss. 8, pp. 89–91.*

* cited by examiner

Primary Examiner—Cong-Lac Huynh
(74) Attorney, Agent, or Firm—Duke W. Yee; Marilyn Smith Dawkins; Theodore D. Fay, III

(57) ABSTRACT

A method, program, and apparatus for providing a description of current position in an electronic document are provided. The invention first comprises parsing the electronic document into a parse tree. When the system receives a command from the user requesting current position in the electronic document, an algorithm performs a walk up the parse tree, from the current position to the root of the document. A position response, containing nodes in the walk up the parse tree, is constructed by the algorithm and reported to the user.

29 Claims, 4 Drawing Sheets

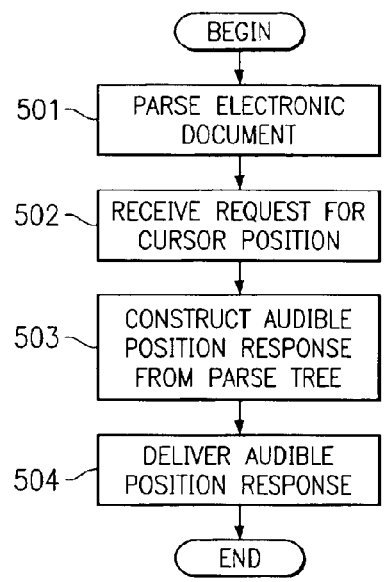
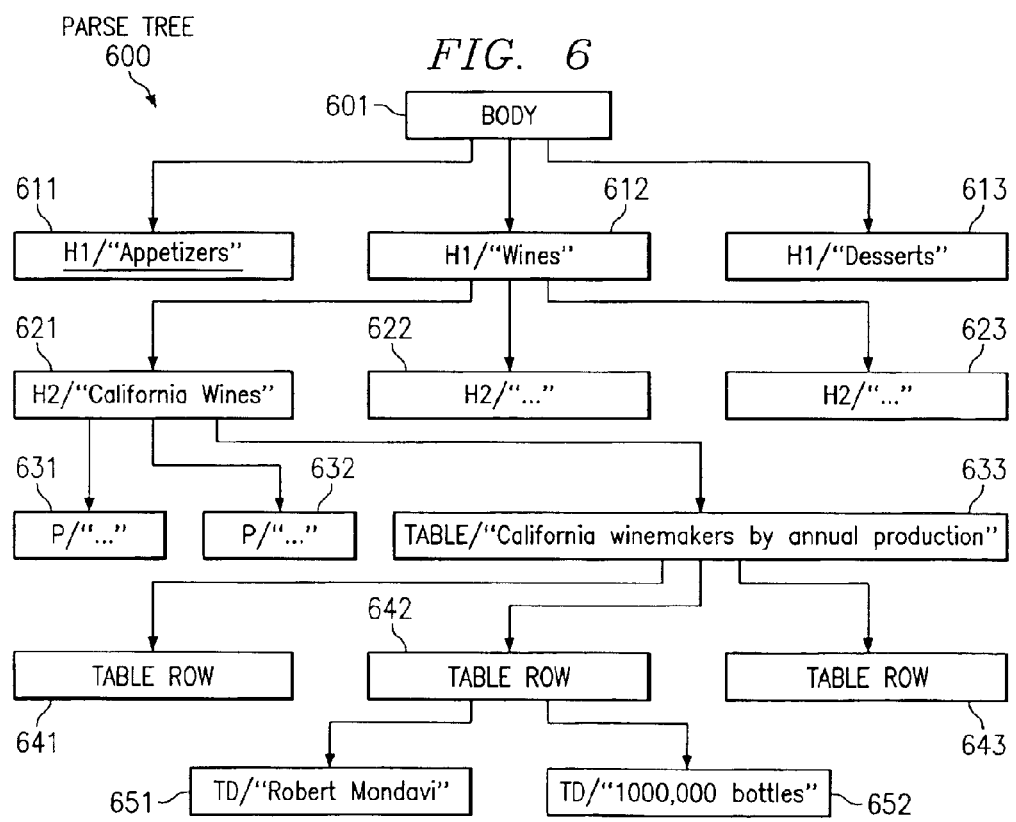

METHOD FOR PROVIDING A DESCRIPTION OF A USER'S CURRENT POSITION IN A WEB PAGE

BACKGROUND OF THE INVENTION

1. Technical Field

The present invention relates to computer network environments. More specifically, the present invention relates to accessing the content of a web page when a visual display is not available.

2. Description of Related Art

Information on the World Wide Web is typically made available by structuring the information into a visual presentation. Hypertext Markup Language (HTML) is used by the web author to define the visual structure. The end user is presented with this information by viewing the information on a computer display, after the information has been rendered into a visual format by a web browser (e.g. Netscape Navigator or Microsoft Internet Explorer).

However, the visual presentation of web pages is not accessible by people with vision impairments, nor is the content accessible by users who do not have a visual display device available. A variety of software products are becoming available which enable non-visual access to the HTML pages. These products capture the web page content and then present an audible rendering of the web page. This is generally accomplished by using a text-to-speech (TTS) technology to read the textual content.

In a non-visual web browser, the current position of the TTS "cursor" in the document is called the Point of Regard (POR). In the absence of visual queues, however, it is often difficult for a user of an audible web browser to determine where the POR is within the current web page. For example, a sighted user viewing a web page might page down through a few screens and see that he is in the second paragraph following a header. The user can also use the visual position of a scroll bar to assess the position relative to the entire page. The visually impaired user (or a sighted user without a visual display), by contrast, may have arrived at the same point in the document after pressing the Scroll Down key several times, but he will have no idea what section he is in. It is easy for such a user to get lost within the document after he has been navigating within it for some time. The visually impaired user might lose track of his overall position within a document (top, middle or bottom), as well as what specific section of the document he is currently accessing. The user might also have problems determining what other content is surrounding the specific content being directly accessed.

Prior art in this area involves counting up every item in the web page and announcing the POR as an index within the total number of items on the page. For example, "Item 54 of 206 items". The running time for this approach is proportional to the number of items on the web page. In addition, the prior art does not provide specific description of the page contents.

Therefore, it would be desirable to have a method for audible description of a user's position in a web page that provides detail concerning web page contents and reduces processing time.

SUMMARY OF THE INVENTION

The present invention provides a method, program, and apparatus for providing a description of current position in an electronic document. The invention first comprises parsing the electronic document into a parse tree. When the system receives a command from the user requesting current position in the electronic document, an algorithm performs a walk up the parse tree, from the current position to the root of the document. A position response, containing nodes in the walk up the parse tree, is constructed by the algorithm and reported to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a flowchart illustrating the general steps of the present invention;

FIG. 6 depicts a diagram illustrating a HTML parse tree in accordance with the present invention.

DETAILED DESCRIPTION OF THE PREFERRED EMBODIMENT

Figure 1:
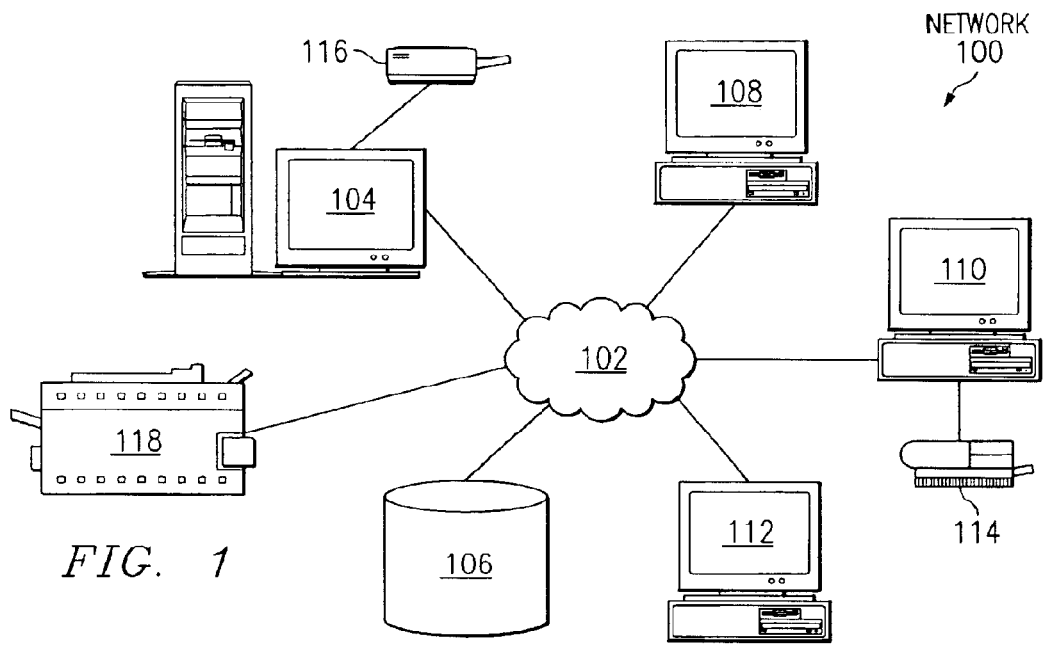
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
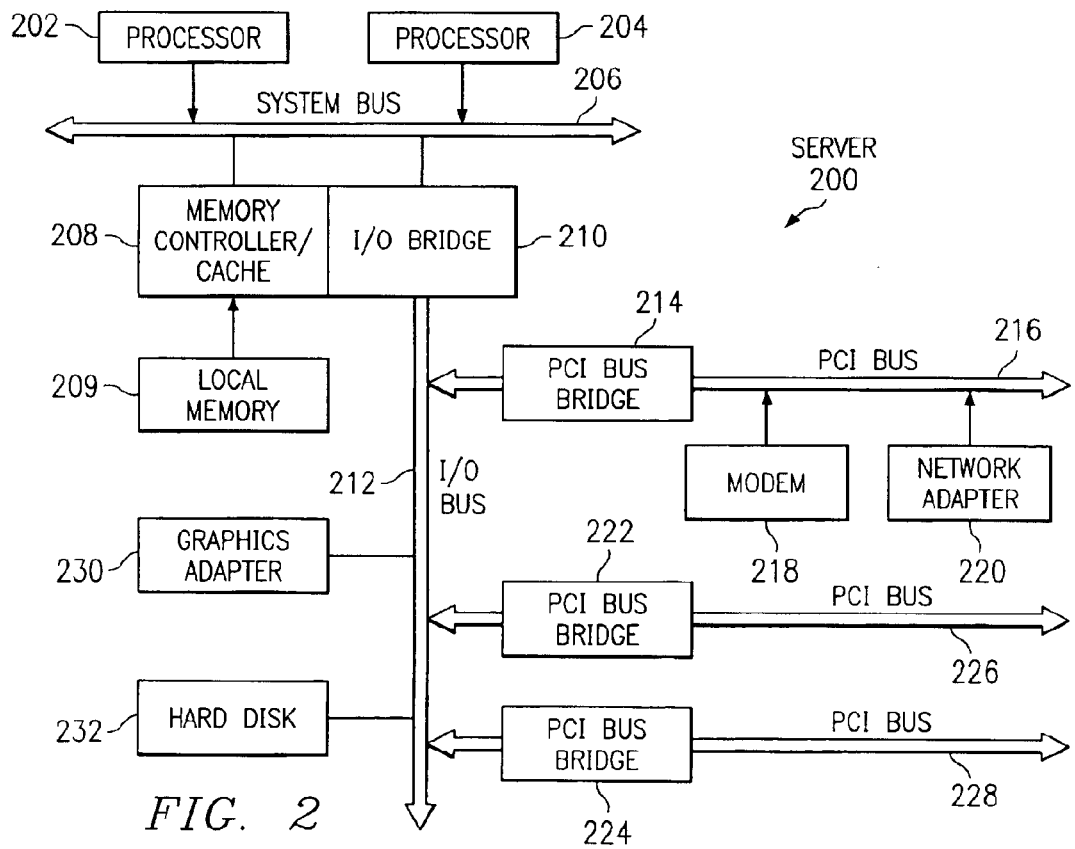
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
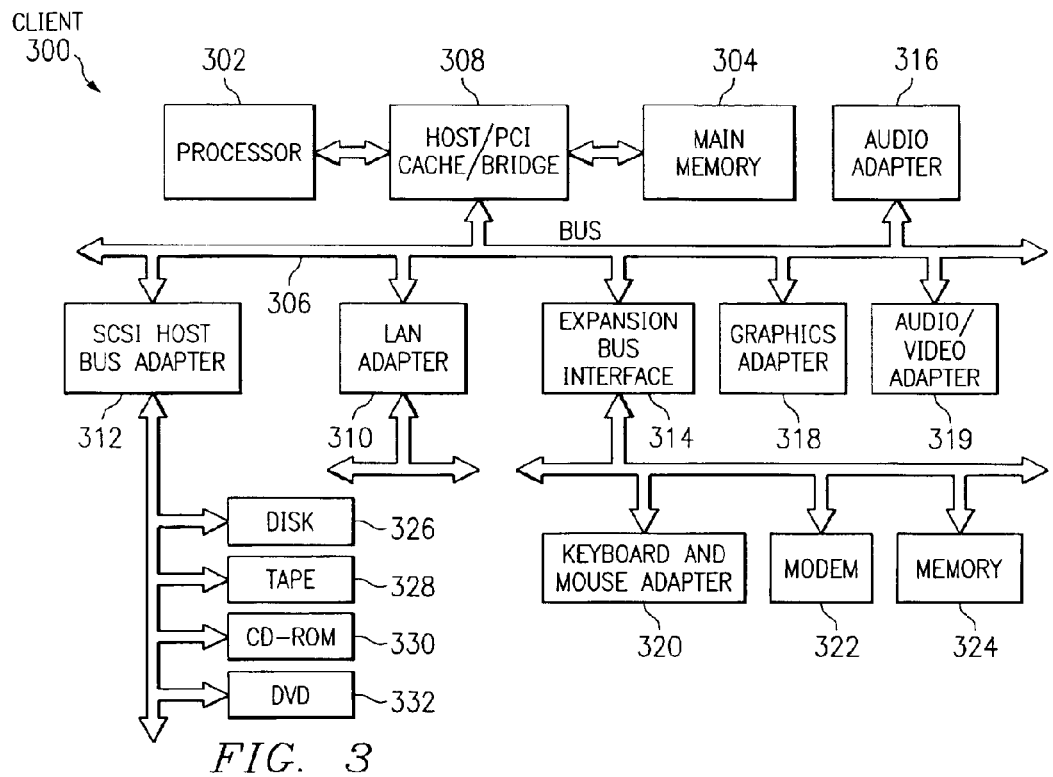
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
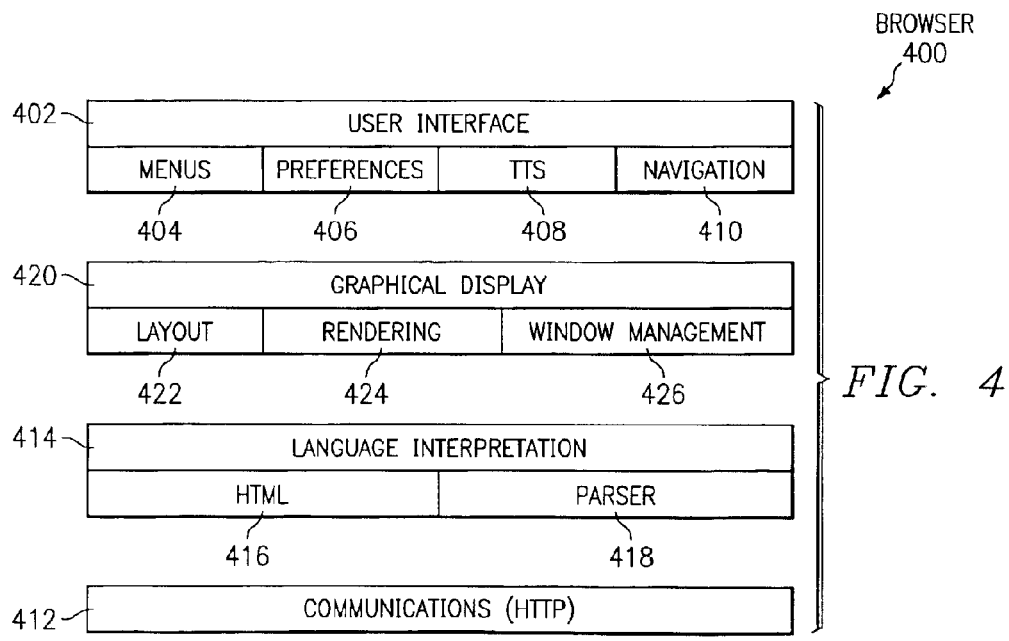
FIG. 4 depicts a block diagram of a browser program in accordance with a preferred embodiment of the present invention.

Turning next to FIG. 4, a block diagram of a browser program is depicted in accordance with a preferred embodiment of the present invention. Browser 400 includes a user interface 402, which is a graphical user interface (GUI) that allows the user to interface or communicate with browser 400. This interface provides for selection of various functions through menus 404 and allows for navigation through the navigation input 410. For example, menu 404 may allow a user to perform various functions, such as saving a file, opening a new window, displaying a history, and entering a URL. Navigation 410 allows for a user to navigate various pages and to select web sites for viewing. For example, navigation 410 may allow a user to see a previous page or a subsequent page relative to the present page. Navigation 410 may also have voice recognition capabilities. Preferences may be set through preferences 406. Browser 400 also contains text-to-speech (TTS) 408, which converts text data into auditory signals.

Communications 412 is the mechanism with which browser 400 receives documents and other resources from a network such as the Internet. Further, communications 412 is used to send or upload documents and resources onto a network. In the depicted example, communication 412 uses HTTP. However, other protocols are possible. Documents that are received by browser 400 are processed by language interpretation 414, which includes an HTML unit 416, and a parser 418 which is capable of generating a parse tree associated with an electronic document, as discussed below in reference to FIG. 6. Language interpretation 414 will process a document for presentation on graphical display 420. In particular, HTML statements are processed by HTML unit 416 for presentation.

Graphical display 420 includes layout unit 422, rendering unit 424, and window management 426. These units are involved in presenting web pages to a user based on results from language interpretation 414.

Browser 400 is presented as an example of a browser program in which the present invention may be embodied. Browser 400 is not meant to imply architectural limitations to the present invention. Presently available browsers may include additional functions not shown or may omit functions shown in browser 400. As used herein, the term "browser" encompasses any software application used to view or navigate for information or data (e.g. something that assists a user to browse) in a distributed data base where the distributed database is typically the internet or World Wide Web.

The present invention allows users with visual impairments, or those without a visual display, to access the contents of electronic documents. Users without visual displays might include, for example, those accessing the internet via cell phone while driving a car. The present invention is faster than the prior art in this area and provides more descriptive information to the user. The present invention is also applicable to document technologies other than HTML, such as Extensible Markup Language (XML).

Referring to FIG. 5, a flowchart illustrates the general steps of the present invention. When an electronic document, such as a web page, is downloaded by browser 400, parser 418 creates a parse tree (step 501). The details of the parse tree are described below in reference to FIG. 6. The system then receives a command from the user requesting information about the cursor's position within the electronic document (step 502). This request may be made by means of any input device, such as for example, keyboard or voice command. In response to the user request, the system constructs an audible response by walking up the parse tree (step 503). This audible response is then delivered to the user by means of a speaker (step 504).

Referring now to FIG. 6, a diagram illustrating an exemplary HTML parse tree is depicted in accordance with the present invention. The present invention describes the cursor position in an electronic document (i.e. web page) by walking the HTML parse tree, from the current TTS position to the root of the document. HTML, which is used to provide a visual structure to the page, can also provide a semantic structure to the page. For example, the HTML markup defines which ranges of text are contained under which heading, or within an item in a list, or within a table. Well known techniques exist for parsing an HTML source file into a parse tree. The various elements and relationships among elements are then apparent from the topology of the parse tree.

The root of the document is the BODY 601. The body consists of several major sections 611–613, each tagged as a Heading 1 (H1). The second H1 section is titled "Wines" 612, which consists of three subsections 621–623 tagged as Heading Level 2 (H2). One of these H2 subsections 621 is titled "California Wines". One of the paragraphs 631–633 in subsection 621 contains a table 633 with the title "California winemakers", and so forth. A "Where Am I" algorithm constructs an audible position identification (using TTS) by walking up the parse tree 600, from the tree node associated with the current POR to the root 601 of the document.

Figure 7:
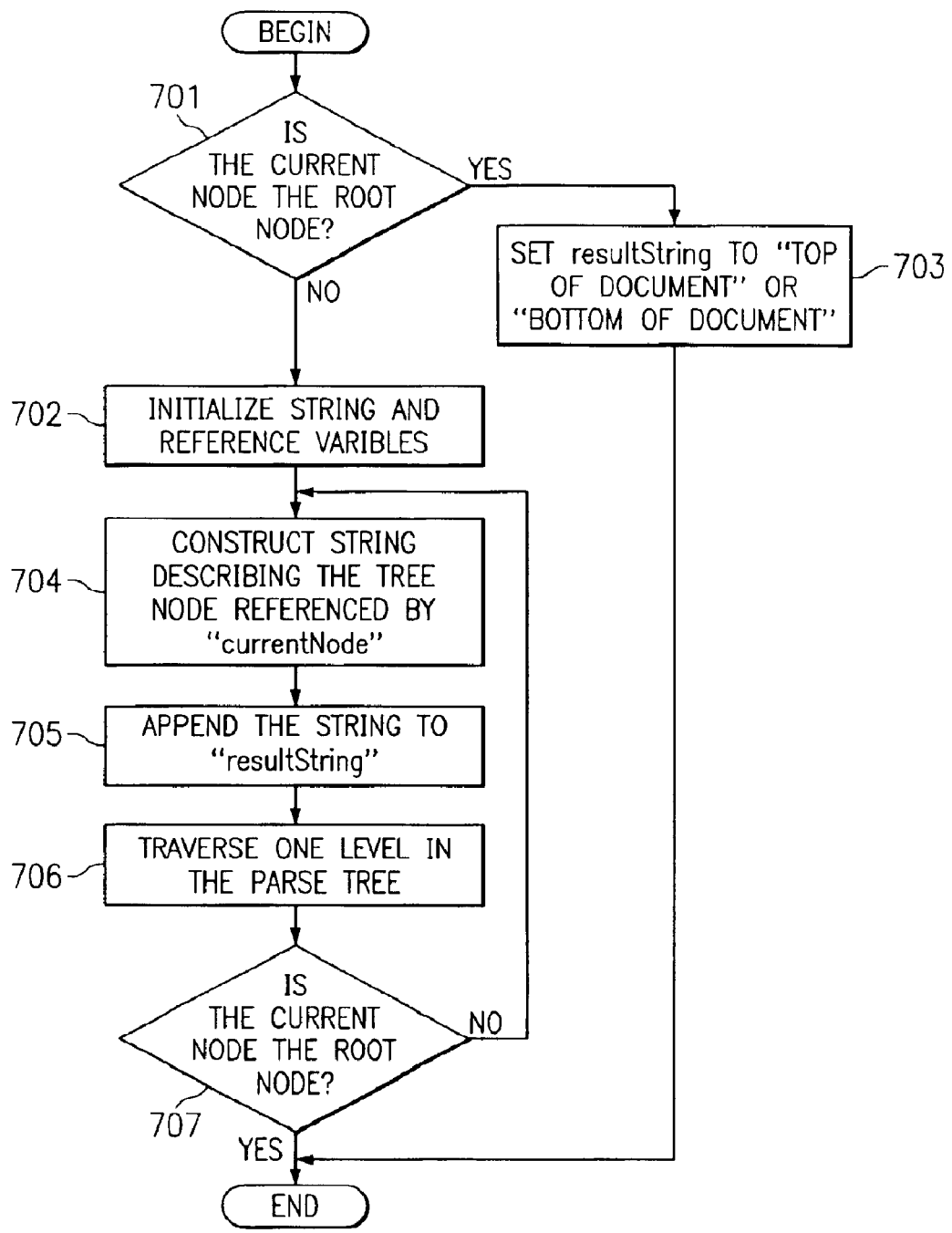
FIG. 7 depicts a flowchart illustrating the algorithm for constructing an audible position identification in accordance with the present invention.

Referring to FIG. 7, a flowchart illustrating the algorithm for constructing an audible position identification is depicted in accordance with the present invention. The first step in the algorithm is to determine if cursor is presently positioned at the root node (step 701). If the current node is the root node, then the algorithm sets the string variable 'resultString' to "Top of document" or "Bottom of document" and the algorithm terminates and 'resultString' contains the "Where Am I" result (step 702). If the current node is not the root node, 'resultString' is initialized to an empty string, and the reference variable 'currentNode' is initialized to the parse tree node associated with the current POR (step 703).

The algorithm next constructs a string which describes the tree node which is referenced by the variable 'currentNode' (step 704). For example, if 'currentNode' references the node labeled 651 in FIG. 6, the algorithm could construct a string which prefixes the phrase "Table cell containing:" to the actual contents of that table cell, which is "Robert Mondavi". For other types of HTML elements, other phrase generating rules could be used. For example, if 'currentNode' is set to the node labeled 642, a TABLE ROW node, the tree could be traversed to determine which row this node represents in the parse tree. For node 642, the row represented is the second row. Therefore, the algorithm could construct the string "Row 2".

The string constructed in step 704 is then appended to 'resultString', including an appropriate separator character, such as a period or semicolon (step 705). The algorithm then traverses one level in the parse tree (step 706). First, a reference to the parent of the node referenced by 'currentNode' is obtained. For example, in FIG. 6, if 'currentNode' references the node labeled 642, the parentNode would be set to reference the node labeled 633. After the reference to the parent node is saved in 'parentNode', the algorithm sets 'currentNode' to reference the same node as 'parentNode'. The cuurent node reference has now moved up one level in the parse tree.

Again, the algorithm checks if the node referenced by 'currentNode' is currently located at the root node (step 707). If the current node is the root node, the algorithm ends and 'resultString' contains the "Where Am I" result. If the current node is not the root node, the algorithm returns to step 704.

Therefore, in the present example, the following string might be constructed:

Current POR is:

Table call containing: "Robert Mondavi".

Row 2.

In table titled: "California winemakers by annual production".

Under Heading 2 section titled: "California wines".

Under Heading 1 section titled: "Wines".

The "Where Am I" algorithm would respond to a user request for WAI information. This request may be by means of any input device, such as, for example, voice command or keyboard.

The present invention confers a number of advantages. It is more descriptive and intuitive than the prior art. It accommodates documents which are changed dynamically, whereas the prior art does not. It is very common for the content of web pages to be updated dynamically by active scripting technolgies, such as JavaScript. Current browser technology (i.e. MS IE 5.0+, Mozilla) maintains the parse tree that is associated with the current web page being accessed by the user, and dynamically updates this tree when the web page is changed.

The present invention is also faster than the prior art. A technique which counts every item on the page, such as is found in the prior art, requires a running time which is proportional to the number of items on the page. Web pages can change dynamically. Under prior art, when a WAI request is processed, every element on the page must be visited (and counted) to determine the index of the current POR and the total number of items on the page. If there are "n" items on the page, the running time of the algorithm will be bounded by the function "a*n", where "a" is some positive real number. Formally, this is called an O(n) performance bound (Reference: *Introduction to Algorithms*, Cormen, Leiserson, and Rivest, ISBN 0-262-53091-0, 1997. Chapter 2, "Growth of Functions"). The algorithm defined by the present invention does not need to visit every element in the web page to determine WAI. Instead, it visits only a very small number of nodes: each of its ancestor nodes from current position to the root of the tree. This number of nodes is no larger than the height of the tree. As described in the cited *Algorithms*. text, Section 13.4. "Randomly built binary search trees", the height of a randomly built tree is a function of log(n), where "n" is the number of nodes in the tree (which is the same as the number of elements in the web page). Therefore, the present invention improves running time from O(n) to O(log(n)), which is an exponential improvement in speed.

In practice, additional rules of thumb might be appropriate to determine which elements should be announced (and which should not) in the course of the walk from the current POR tree node to the root. For example, elements such as SPAN (which specifies a non-visible formatting division) might not be announced. SPAN is used by HTML authors to identify a block of HTML. As another example, if the current position is in a table with one row and one column, the algorithm could include a rule of thumb that specifies that such tables are not announced.

The present invention is also applicable to any XML or Direct Object Model (DOM) technology. HTML technology has been generalized into a more formal, and more widely applicable technology called Extensible Markup Language (XML). Whereas HTML provides a structure only for visual layout of web pages, XML provides a mechanism for defining the structure and meaning of data in a generalized document definition language. XML is being applied to a wide problem domain, and is applicable wherever information needs to be exchanged between independent information systems. The most recent HTML definitions have redefined HTML as an instance of XML document definition technology. A DOM is the parse tree for an XML document. The present invention for audible description of the position of a document cursor within a HTML document is applicable to any XML document as well. The POR can be constructed by visiting each node in the DOM which is on the path from the current position to the root of the tree. At each node, the XML tag name and value would be announced.

Several versions of a response might be used to further improve the utility of the "Where Am I" algorithm. A "verbose" response would provide all the information available from a complete walk up the parse tree, from current position to the document root. While this response would be the most informative, it may provide more information than the user wants, particularly if the user queries his position several times from adjacent positions in the document.

A "terse" response would provide an alternative. In this case, position information would be gathered only by examining the first few immediate parents of the current parse tree node. A threshold value might be set by the user, which would control how much of the parse tree would be examined for position information. The position algorithm would only walk up the predefined number of parents in the parse tree, or to the root, whichever comes first.

A "delta" response provides yet another alternative. Under this approach, the "Where Am I" facility would maintain variables which track the parse tree location of the last "Where Am I" query, and the verbose response that would be constructed at that location. When a new "Where Am I" query arrives, a verbose response is constructed for the new location. Then the responses for the old and new locations are compared, and only those elements which are different are reported to the user. It should be noted that this is a computationally efficient approach, because only the two paths from location to root need to be compared in order to determine which nodes are different.

The example used in describing the present invention has focused primarily on providing the user with an audible position response. However, the present invention need not be limited to an audible announcement of cursor position. The position could be communicated through a tactile feedback mechanism such as a braille display. The present invention might also be used in a visual display that is not a graphical browser. For example, a text-only browser might be used, which does not format or arrange text within a graphical layout, but rather displays the text part of a web page as a character stream.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing a description of current position in an electronic document, comprising:
   parsing an electronic document into a parse tree;
   receiving a user request for a description of cursor position in the electronic document;
   using an algorithm to construct a position response by walking up the parse tree, from the tree node associated with the current position in the electronic document to the root of the electronic document; and
   delivering the position response to the user.

2. The method according to claim 1, wherein the position response is audible.

3. The method according to claim 1, wherein the position response is by means of a tactile feedback mechanism.

4. The method according to claim 1, wherein the position response is by means of a text-only display.

5. The method according to claim 1, wherein the user command requesting cursor position is a voice command.

6. The method according to claim 1, wherein the algorithm uses text-to-speech technology.

7. The method according to claim 1, wherein the position response comprises all nodes in the walk up the parse tree.

8. The method according to claim 1, wherein the position response comprises:
   a predefined number of nodes in the walk up the parse tree;
   wherein the predefined number of nodes is set by the user and limited by the number of nodes between the current position and the electronic document root.

9. The method according to claim 1, wherein the electronic document is a HTML document.

10. The method according to claim 1, wherein the electronic document is a XML document.

11. A method for providing a description of current position in an electronic document, comprising:
    parsing an electronic document into a parse tree;
    receiving a user request for a description of cursor position in the electronic document;
    using an algorithm to construct a position response by walking up the parse tree, from the tree node associated with the current position in the electronic document to the root of the electronic document;
    delivering the position response to the user,
    constructing a position response for a new position in the electronic document;
    comparing the position response for the new position with the position response for a previous position; and
    reporting to the user only those nodes in the new position response which differ from the nodes in the previous position response.

12. A method for receiving a description of current position in an electronic document, comprising:
    entering a user command requesting a description of cursor position in an electronic document; and
    receiving a position response comprising nodes in a walk up a parse tree constructed from the electronic document.

13. The method according to claim 12, wherein the step of entering a user request for cursor position is by means of voice command.

14. The method according to claim 12, wherein the position response comprises all nodes in the walk up the parse tree.

15. The method according to claim 12, wherein the position response is audible.

16. The method according to claim 12, wherein the position response is by means of a tactile feedback mechanism.

17. The method according to claim 12, wherein the position response is by means of a text-only display.

18. The method according to claim 12, wherein the position response comprises:
    a predefined number of nodes;
    wherein the predefined number of nodes is set by the user and is limited by the number of nodes between the current position and the root of the electronic document.

19. A method for receiving a description of current position in an electronic document, comprising:
    entering a user command requesting a description of cursor position in an electronic document; and
    receiving a position response comprising nodes in a walk up a parse tree constructed from the electronic document;
    wherein the position response comprises only those nodes which differ from a previous position response.

20. A computer program product in a computer readable medium for use in a data processing system, for providing a description of current position in an electronic document, the computer program product comprising:
    instructions for parsing an electronic document into a parse tree;
    instructions for receiving a user command requesting cursor position in the electronic document;
    an algorithm to construct a position response by walking up the parse tree, from the tree node associated with the current position in the electronic document to the root of the electronic document; and
    instructions for delivering the position response to the user.

21. The computer program product according to claim 20, wherein the algorithm uses text-to-speech technology.

22. The computer program product according to claim 20, wherein the position response comprises all nodes in the walk up the parse tree.

23. The computer program product according to claim 20, wherein the position response comprises:
    a predefined number of nodes in the walk up the parse tree;
    wherein the predefined number of nodes is set by the user and limited by the number of nodes between the current position and the electronic document root.

24. The computer program product according to claim 20, wherein the electronic document is a HTML document.

25. The computer program product according to claim 20, wherein the electronic document is a XML document.

26. A computer program product in a computer readable medium for use in a data processing system, for providing a description of current position in an electronic document, the computer program product comprising:
    instructions for parsing an electronic document into a parse tree;
    instructions for receiving a user command requesting cursor position in the electronic document;
    an algorithm to construct a position response by walking up the parse tree, from the tree node associated with the current position in the electronic document to the root of the electronic document;

instructions for delivering the position response to the user;

an algorithm for constructing a position response for a new position in the electronic document;

instructions for comparing the position response for the new position with the position response for a previous position; and instructions for reporting to the user only those nodes in the new position response which differ from the nodes in the previous position response.

27. A computer program product in a computer readable medium for use in a data processing system, for receiving a description of current position in an electronic document, the computer program product comprising:

instructions for entering a user command requesting a description of cursor position in an electronic document; and instructions for receiving a position response comprising nodes in a walk up a parse tree constructed from the electronic document.

28. An apparatus for providing a description of current position in an electronic document, comprising:

a parsing component which parses an electronic document into a parse tree;

a command receiver which receives a user command requesting a description of cursor position in the electronic document;

a data processor which uses an algorithm to construct a position response by walking up the parse tree, from the tree node associated with the current position in the electronic document to the root of the electronic document; and a feedback mechanism to deliver the position response to the user.

29. A system for receiving a description of current position in an electronic document, comprising:

means for entering a user command requesting a description of cursor position in an electronic document; and means for receiving a position response comprising nodes in a walk up a parse tree constructed from the electronic document.

* * * * *